United States Patent
Ruckart (10) Patent No.: US 8,401,906 B2
(45) Date of Patent: Mar. 19, 2013

(54) FINANCIAL TRANSACTION AUTHENTICATION SERVERS, METHODS, AND COMPUTER PROGRAM PRODUCTS FOR FACILITATING FINANCIAL TRANSACTIONS BETWEEN BUYERS AND SELLERS

(75) Inventor: John Ruckart, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 16 days.

(21) Appl. No.: 11/954,928

(22) Filed: Dec. 12, 2007

(65) Prior Publication Data

US 2009/0157547 A1 Jun. 18, 2009

(51) Int. Cl.
*G06Q 30/00* (2006.01)
*G06Q 10/00* (2006.01)
*G06Q 40/00* (2006.01)
*G06Q 20/00* (2006.01)
*H04M 11/00* (2006.01)
*H04M 3/42* (2006.01)
*H04W 24/00* (2009.01)
*G06F 7/08* (2006.01)
*G06K 5/00* (2006.01)

(52) U.S. Cl. .................. 705/26; 705/1; 705/10; 705/14; 705/17; 705/18; 705/26.2; 705/27; 705/37; 705/39; 705/44; 705/418; 455/406; 455/414.1; 455/456; 235/380; 235/381

(58) Field of Classification Search .................. 455/406, 455/414.1, 456; 705/26, 39, 1, 14, 17, 27, 705/37, 44, 10, 18, 26.2, 418; 235/381, 380
See application file for complete search history.

(56) References Cited

U.S. PATENT DOCUMENTS

| | | | | |
|---|---|---|---|---|
| 5,870,723 A | * | 2/1999 | Pare et al. | 705/39 |
| 6,422,462 B1 | * | 7/2002 | Cohen | 235/381 |
| 6,868,391 B1 | * | 3/2005 | Hultgren | 705/17 |
| 7,292,998 B2 | * | 11/2007 | Graves et al. | 705/44 |

(Continued)

FOREIGN PATENT DOCUMENTS

WO WO 2007/004224 * 1/2007

OTHER PUBLICATIONS

•Collins English Dictionary—Complete and Unabridged © . Def. "consider". HarperCollins Publishers 1991, 1994, 1998, 2000, 2003.*

(Continued)

*Primary Examiner* — Sarah M. Monfeldt
*Assistant Examiner* — Barbara Joan Amelunxen
(74) *Attorney, Agent, or Firm* — Parks IP Law LLC; Jennifer P. Medlin, Esq.

(57) ABSTRACT

A financial transaction authentication server includes a wireless network interface that is configured to receive fund transfer requests from a buyer via a wireless communications terminal, a wireless terminal location module that is configured to identify the respective locations of the buyer and a seller, and a transaction authorization processor configured to authorize a transfer request if the geographic locations of wireless terminals of the buyer and seller are within a predetermined geographical proximity of each other. The wireless network terminal location module identifies the geographic locations of respective wireless terminals of the buyer and seller. The transaction authorization processor authorizes a fund transfer request if the respective locations of buyer and seller wireless terminals are within a predetermined geographical proximity and suspends a fund transfer request if respective locations of buyer and seller wireless terminals are not within a predetermined geographical proximity of each other.

20 Claims, 3 Drawing Sheets

U.S. PATENT DOCUMENTS

| | | | |
|---|---|---|---|
| 2002/0025796 A1* | 2/2002 | Taylor et al. | 455/406 |
| 2002/0059111 A1* | 5/2002 | Ding et al. | 705/26 |
| 2002/0087392 A1* | 7/2002 | Stevens | 705/10 |
| 2002/0087459 A1* | 7/2002 | Taguchi et al. | 705/37 |
| 2002/0095357 A1* | 7/2002 | Hunter et al. | 705/27 |
| 2002/0107027 A1* | 8/2002 | O'Neil | 455/456 |
| 2002/0116214 A1* | 8/2002 | Horn | 705/1 |
| 2002/0174067 A1* | 11/2002 | Hoffman et al. | 705/39 |
| 2003/0009421 A1* | 1/2003 | Bansal et al. | 705/39 |
| 2004/0039637 A1* | 2/2004 | Kopf et al. | 705/14 |
| 2005/0125337 A1* | 6/2005 | Tidwell et al. | 705/39 |
| 2005/0251460 A1* | 11/2005 | Quigley | 705/26 |
| 2007/0084913 A1* | 4/2007 | Weston | 235/380 |
| 2008/0162346 A1* | 7/2008 | Aaron et al. | 705/44 |
| 2008/0222038 A1* | 9/2008 | Eden et al. | 705/44 |
| 2009/0171799 A1* | 7/2009 | Ying | 705/18 |
| 2010/0291907 A1* | 11/2010 | MacNaughtan et al. | 455/414.1 |
| 2011/0099126 A1* | 4/2011 | Belani et al. | 705/418 |
| 2011/0320301 A1* | 12/2011 | Van Horn et al. | 705/26.2 |

OTHER PUBLICATIONS

Gesbert et al., Adaptation, Coordination, and Distributed Resource Allocation in Interference-Limited Wireless Networks, Proceedings of the IEEE, vol. 95, No. 12, Dec. 2007, pp. 2393-2409.*

* cited by examiner

FINANCIAL TRANSACTION AUTHENTICATION SERVERS, METHODS, AND COMPUTER PROGRAM PRODUCTS FOR FACILITATING FINANCIAL TRANSACTIONS BETWEEN BUYERS AND SELLERS

BACKGROUND

The present application relates generally to communications networks, and, more particularly, to methods, systems, and computer program products for facilitating commerce via communications networks.

Communications networks are widely used for nationwide and worldwide communication of voice, multimedia and/or data. As used herein, the term "communications networks" includes public communications networks, such as the Public Switched Telephone Network (PSTN), terrestrial and/or satellite cellular networks, private networks and/or the Internet.

The Internet is a decentralized network of computers that can communicate with one another via Internet Protocol (IP). The Internet includes the World Wide Web (web) service facility, which is a client/server-based facility that includes a large number of servers (computers connected to the Internet) on which web pages or files reside, as well as clients (web browsers), which interface users with the web pages. The topology of the web can be described as a network of networks, with providers of network services called Network Service Providers, or NSPs. Servers that provide application-layer services may be referred to as Application Service Providers (ASPs). Sometimes a single service provider provides both functions.

The Internet has evolved into a viable commercial medium where buyers and sellers of goods and services can engage in various types of commerce. PayPal® is a popular online payment service for purchases made online. PayPal® allows buyers to pay via credit cards, bank accounts, buyer credit or account balances, without sharing financial information with sellers. Moreover, PayPal® may facilitate global e-commerce by making payments possible across different locations, currencies, and languages. Although popular for people making purchases online, PayPal® may not be available and/or may be cumbersome to use in commercial settings such as garage sales, flea markets, and other instances where buyers and sellers conduct face-to-face transactions.

SUMMARY

According to exemplary embodiments, financial transaction authentication servers, methods and/or computer program products are provided that facilitate financial transactions between buyers and sellers. In some embodiments, a financial transaction authentication server includes a wireless network interface that is configured to receive money transfer requests from buyers via wireless communications terminals, a wireless terminal location module that is configured to identify the respective locations of buyers and sellers, and a transaction authorization processor configured to authorize a transfer request if the locations of a buyer and seller are within a predetermined geographical proximity of each other. An exemplary transfer request identifies a financial account of a buyer, a financial account of a seller, and an amount to be transferred from a buyer's financial account to the seller's financial account.

The wireless network terminal location module is configured to identify the locations of respective wireless communications terminals of the buyer and seller, for example, via a GPS system and/or via a wireless network provider. The transaction authorization processor is configured to authorize the transfer of funds from the identified buyer account to the identified seller account if the respective locations of the buyer and seller wireless terminals are within a predetermined geographical proximity (i.e., the buyer and seller are "co-located"). The transaction authorization processor is configured to suspend the transfer request and/or notify the buyer if respective locations of the buyer and seller wireless terminals are not within a predetermined geographical proximity of each other.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which form a part of the specification, illustrate some exemplary embodiments. The drawings and description together serve to fully explain the exemplary embodiments.

DETAILED DESCRIPTION

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification are taken to specify the presence of stated features, steps, operations, elements, and/or components, but do not preclude the presence or addition of one or more other features, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another.

Exemplary embodiments are described below with reference to block diagrams and/or flowchart illustrations of methods, apparatus (systems and/or devices) and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, exemplary embodiments may be implemented in hardware and/or in software (including firmware, resident software, micro-code, etc.). Furthermore, exemplary embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Java, AJAX (Asynchronous JavaScript), C, and/or C++, for development convenience. In addition, computer program code for carrying out operations of exemplary embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a programmed digital signal processor or microcontroller.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Figure 1:
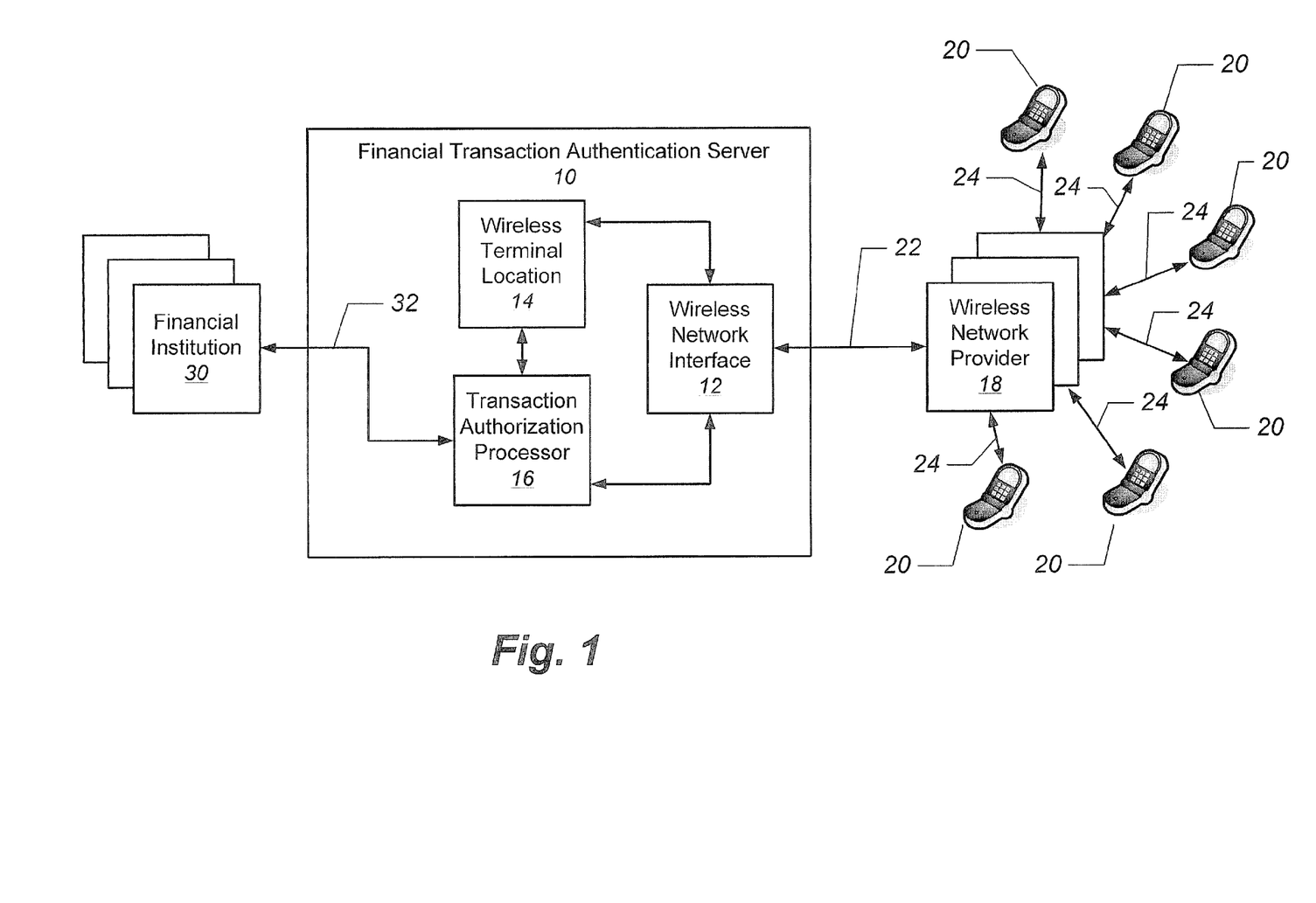
FIG. 1 is a block diagram of financial transaction authentication servers, methods and/or computer program products according to various embodiments.

FIG. 1 is a block diagram of financial transaction authentication servers, methods and/or computer program products according to various exemplary embodiments. Referring now to FIG. 1, the illustrated financial transaction authentication server 10 includes a wireless network interface 12, a wireless terminal location module 14, and a transaction authorization processor 16. The financial transaction authentication server 10 may be embodied as one or more enterprise, application, personal, pervasive and/or embedded computer systems that are connected via a wireless and/or wired, private and/or public network, including the Internet.

The wireless network interface 12 facilitates communications between the financial transaction authentication server 10 and a plurality of consumer wireless terminals 20 that are associated with a plurality of wireless network providers 18. The wireless network interface 12 is configured to receive money transfer requests from consumers via the wireless communications terminals 20. For example, a buyer, who has agreed to purchase goods and/or services from a seller, enters a request via the buyer's wireless terminal 20 to transfer money/funds from a financial account of the buyer to a financial account of the seller. Accordingly, each transfer request at least identifies a financial account of the buyer, a financial account of the seller, and a monetary amount to be transferred from the buyer's financial account to the seller's financial account. A transfer request may include other information and/or may require other information from a buyer. For example, a buyer may be required to enter a password/passcode/PIN (Personal Identification Number) with the transfer request.

Communications between wireless terminals 20 associated with a wireless network provider 18 may occur over one or more private and/or public wired and/or wireless communications links 22. The wireless terminals 20 may communicate with the wireless network providers 18 over one or more wireless links 24 using conventional wireless protocols. As used herein, the term "wireless terminal" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and a pager, Internet/intranet access, Web browser, organizer, calendar and/or a global positioning system (GPS) receiver; and/or conventional laptop and/or palmtop computers or other appliances, which include a radio frequency transceiver. Thus, there may be several different types of wireless terminals 20. By providing an interface to multiple wireless network providers 18, communications can occur with many wireless terminals 20 for authenticating money transfer requests, as will be described below. However, in other embodiments, the server 10 may communicate with wireless terminals 20 associated with a single wireless network provider 18.

Still referring to FIG. 1, the server 10 includes a wireless terminal location module 14 that is configured to identify the respective locations of buyers and sellers by determining the location of buyers' and sellers' wireless terminals 20. The wireless terminal location module 14 may be configured to communicate with a wireless terminal 20 and determine a present location of the wireless terminal 20 using, for example, a global positioning system (GPS) present in the wireless terminal 20 or associated therewith and/or other location based systems that can provide its latitude and longitude (and/or other) coordinates. The use of GPSs in and with portable wireless terminals is understood by those having skill in the art and, therefore, the details will not be discussed herein.

Alternatively, the wireless terminal location module 14 may be configured to communicate with a wireless network provider 18 and obtain location information for a wireless terminal 20 from the wireless network provider 18. For example, a wireless network provider 18 may determine the location of a wireless terminal 20 by triangulation of radio communication signals received by multiple cellular base stations from the wireless terminal 20 and/or by receiving from the wireless terminal 20 its own determined location. In some embodiments, a buyer and/or seller may be a merchant and a merchant name and/or identification number may be applied to a geographic information system to obtain the merchant location. Geographical information systems such as Google® Maps or MapQuest® are well known to those having skill in the art and need not be described further herein.

Alternatively or additionally, short-range sensing/distance measuring techniques may be used to determine proximity between the wireless terminals 20 of buyers and sellers, without the need to determine their actual geographic locations. For example, a wireless terminal 20 can use Bluetooth, Wi-Fi and/or other short-range ad hoc wireless links to query another wireless terminal 20. The queried wireless terminal 20 may then reply with an identification, and the time involved may determine the distance between the two wireless terminals. In another example, the ability to set up an ad hoc short-range wireless link, such as Bluetooth, between two wireless terminals 20 (i.e., a buyer's wireless terminal and a seller's wireless terminal), may itself provide an indication that the wireless terminals 20 are sufficiently close to one another to allow a money transfer request to be authenticated.

Still referring to FIG. 1, the server 10 includes a transaction authorization processor 16 configured to authorize a transfer request from a buyer if the locations of a buyer and seller are within a predetermined geographical proximity of each other (i.e., near each other). In some embodiments, the transaction authorization processor 16 communicates with the wireless terminal location module 14 and compares the geographic location of a buyer's wireless terminal 20 and the geographical location of a seller's wireless terminal 20. If the respective geographical locations of the buyer's wireless terminal 20 and the seller's wireless terminal 20 are within a predetermined distance of each other (e.g., ten feet, twenty feet, etc.), the transaction authorization processor 16 will authorize the requested transfer of money from a financial account of the buyer to a financial account of the seller. In some embodiments, the transaction authorization processor 16 is configured to send instructions to one or more financial institutions 30 to transfer money from a buyer's account to a seller's account. For example, if a buyer's financial account is managed by a first financial institution and a seller's financial account is managed by a second financial institution, the transaction authorization processor 16 is configured to send instructions to the first financial institution to transfer payment from the buyer's financial account to the seller's financial account at the second financial institution. However, in some cases, a buyer and seller may have respective financial accounts managed by the same financial institution. In this case, the transaction authorization processor 16 sends instructions to the financial institution 30 to transfer payment from the buyer's financial account to the seller's financial account.

In some embodiments, if the respective geographical locations of the buyer's wireless terminal 20 and the seller's wireless terminal 20 are not within a predetermined distance of each other (e.g., ten feet, twenty feet, etc.), the transaction authorization processor 16 is configured to suspend a transfer request and/or send an alert to a buyer that a received transfer request may be fraudulent. For example, if the server 10 has received what otherwise appears to a valid request to transfer money from a financial account of one person to a financial account of another person, but it is determined that the two persons are not co-located (i.e., not within close proximity of each other), it is possible that this is a fraudulent transaction request. In some embodiments, a determination that two wireless terminals 20 are not in close proximity may trigger the server 10 to re-obtain the geographical locations of the two wireless devices 20. For example, the buyer and seller of a valid transaction may have temporarily moved apart from each other. Embodiments may allow for multiple re-acquisitions of geographical locations of two wireless terminals 20.

The definition of "within a predetermined geographical proximity" or "close proximity" may always be the same or may vary depending upon the buyer and/or seller or other circumstances. For example, it may require that a buyer's wireless terminal 20 and a seller's wireless terminal 20 be within 10 feet, or a minimum resolution distance of whatever location determining system is being utilized by the wireless terminal location module 14. However, this distance may be relaxed in certain circumstances (e.g., the buyer and/or seller is a merchant, etc.). For example, if the buyer and/or seller is a merchant, the merchant(s) may not have a wireless terminal 20 on his/her person. The merchant's wireless terminal may be located a considerable distance away from the merchant. As such, the distance between a buyer and seller that satisfies "within a predetermined geographical proximity" may be larger, for example, up to about 40 feet or more. In still other embodiments, "within a predetermined geographical proximity" may be based on the type of wireless terminals 20 of buyers and sellers. For example, a laptop computer may be kept in a briefcase, and may be allowed a wider latitude than a cell phone or pager which is typically carried by a buyer/ seller. Moreover, the predetermined geographical proximity may vary based on the time of day, the history of use, types/ models of wireless terminals, ambient wireless interference conditions, error conditions and/or thresholds, and/or other criteria, or may be fixed.

Figure 2:
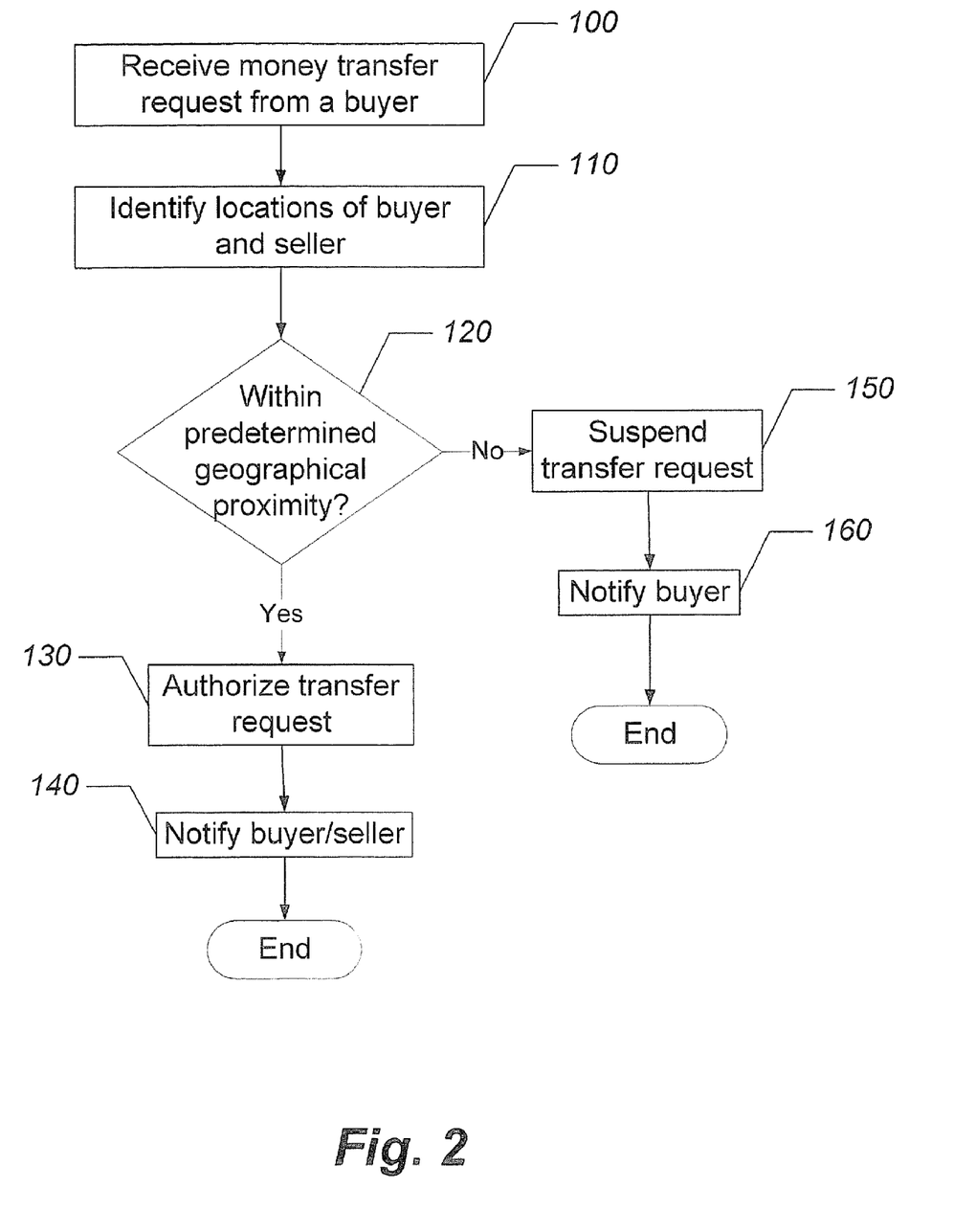
FIG. 2 is a flowchart that illustrates exemplary operations for facilitating financial transactions between buyers and sellers, according to some embodiments.

FIG. 2 is a flowchart of operations that may be performed by the financial transaction authentication server 10. Referring now to FIG. 2, a money transfer request is received from a buyer via a wireless communications terminal 20 (Block 100). The information in the transfer request identifies a financial account of the buyer, a financial account of a seller, and an amount to be transferred from the buyer's financial account to the seller's financial account. Other information may be included within the transfer request, as well. In response to receiving the transfer request, the wireless terminal location module 14 identifies the respective locations of the buyer and seller by determining the geographical location of respective wireless terminals 20 of the buyer and seller (Block 110). As described above, identifying the locations of the respective wireless communications terminals of the buyer and seller may involve obtaining location information from a GPS system and/or obtaining location information from a wireless network provider 18.

Once the location information is obtained for a buyer's wireless terminal and a seller's wireless terminal, a determination is made whether the buyer's wireless terminal and seller's wireless terminal are within a predetermined geographical proximity (i.e., determining whether the buyer and seller are at the same location) (Block 120). If the wireless terminals 20 of the buyer and seller are within a predetermined geographical proximity, it is assumed that the buyer and seller are at the same location, and the transaction authorization processor 16 authorizes the transfer request (Block 130). Authorizing a transfer request may include sending, to the financial institution that manages the identified buyer's account, instructions to transfer funds from the buyer's account to a seller's account. In some embodiments, the transaction authorization processor 16 notifies the buyer and/ or seller that a transfer request has been authorized (Block 140). The transaction authorization processor 16 may notify a buyer/seller via short message service (SMS), e-mail, voicemail, and/or other known modes of communication with wireless terminals 20.

If the wireless terminals 20 of the buyer and seller are not within a predetermined geographical proximity (Block 120), the transaction authorization processor 16 is configured to suspend a transfer request (Block 150) and notify the buyer that a received transfer request may be fraudulent (Block 160).

Figure 3:
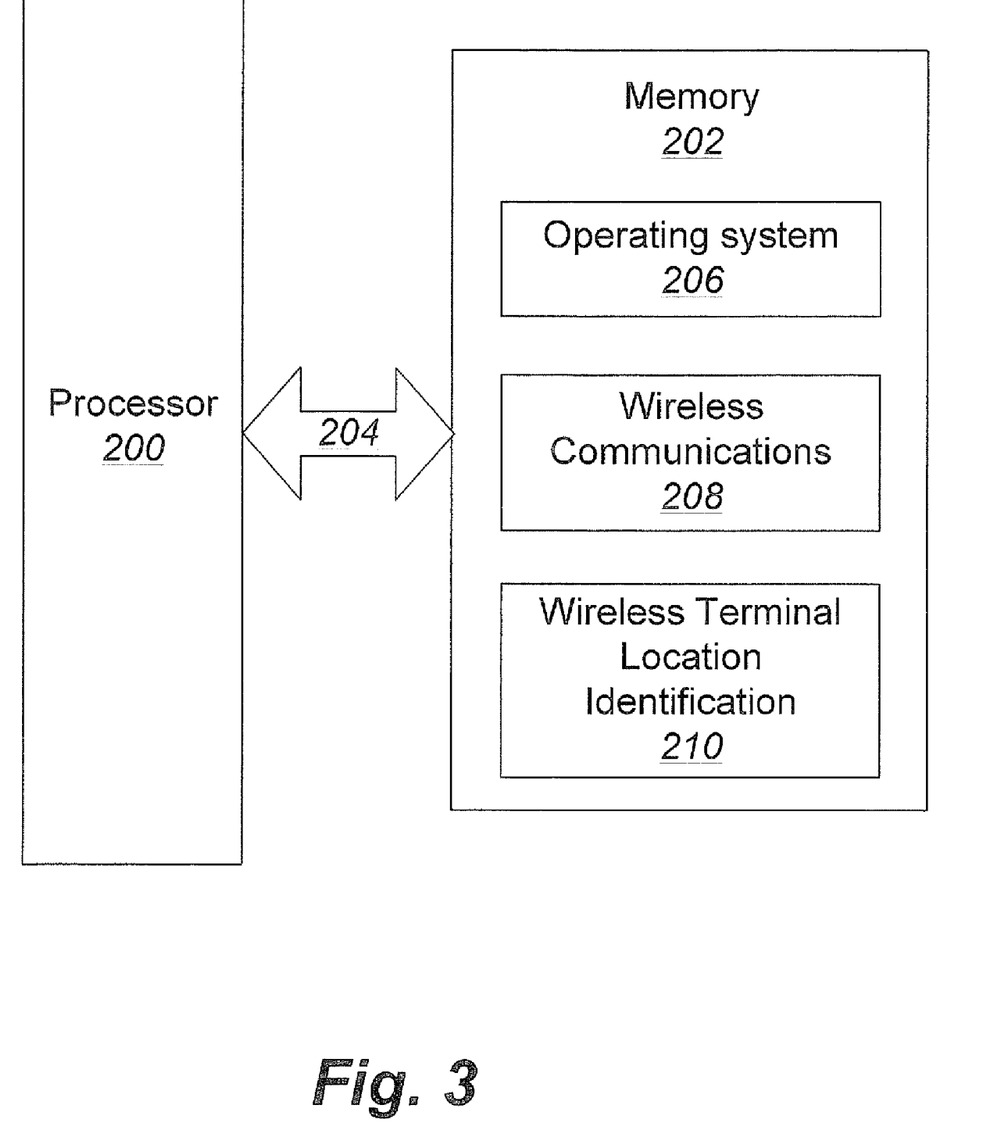
FIG. 3 is a block diagram that illustrates details of a financial transaction authentication server, according to some embodiments.

FIG. 3 illustrates an exemplary processor 200 and memory 202 that may be used in embodiments of financial transaction authentication servers 10. The processor 200 communicates with the memory 202 via an address/data bus 204. The processor 200 may be, for example, a commercially available or custom microprocessor. The memory 202 is representative of the overall hierarchy of memory devices containing the software and data used to implement a financial transaction authentication server 10 as described herein, in accordance with some embodiments. The memory 202 may include, but is not limited to, the following types of devices: cache, ROM, PROM, EPROM, EEPROM, flash, SRAM, and DRAM.

As shown in FIG. 3, the memory 202 may hold various categories of software and data: an operating system 206, a wireless communications module 208, and a wireless terminal location identification module 210. The operating system 206 controls operations of the services provided by the financial transaction authentication server 10 (or a portion of services). In particular, the operating system 206 may manage a financial transaction authentication server's resources and may coordinate execution of various programs (e.g., the wireless communications module 208, wireless terminal location identification module 210, etc.) by the processor 200.

The financial transaction authentication server 10 can communicate in various ways with the wireless terminals 20 of buyers and sellers. For example, the financial transaction authentication server 10 can communicate with wireless terminals over network protocols like HTTP or TCP/IP, etc. In addition, the financial transaction authentication server 10 can communicate wirelessly with one or more of the wireless terminals 20, such as via an RF communication link using an antenna. Other means of wireless communication between the financial transaction authentication server 10 and wireless terminals of buyers and sellers can be employed, as well.

The wireless communications module 208 comprises logic for receiving money transfer requests from consumers via wireless communications terminals 20 (i.e., implementing the functions of the wireless network interface 12), as described above. The wireless terminal location identification module 310 comprises logic for communicating with a wireless terminal 20 and/or a wireless network provider to obtain location information for the wireless terminal 20 (i.e., implementing the functions of the wireless terminal location module 14), as described above.

EXAMPLE

A potential buyer sees an ad for a boat listed for sale on "Craigslist" (craigslist.org) and contacts the person selling the boat. They arrange to meet so that the buyer can look over the boat and decide if he/she wants to buy the boat. Upon deciding to purchase the boat from the seller, the buyer sends a money transfer request via his/her wireless terminal to the financial transaction authentication server 10. The transfer request identifies his/her financial account from which funds are to be transferred, the amount of funds to be transferred, and the financial account of the seller to which the funds are to be transferred. Upon receiving the transfer request, the financial transaction authentication server 10 checks to see if the buyer and seller are geographically near each other by determining the geographical locations of their respective wireless terminals. If the respective geographical locations of the buyer's wireless terminal 20 and the seller's wireless terminal 20 are within a predetermined distance, it is presumed that the transfer request is valid, and the financial transaction authentication server 10 authorizes the transfer of funds to the seller's account. If the respective geographical locations of the buyer's wireless terminal 20 and the seller's wireless terminal 20 are not within a predetermined distance of each other, the transaction authorization processor 16 suspends the transfer request and sends an alert to a buyer that a received transfer request may be fraudulent.

Many variations and modifications can be made to the preferred embodiments without substantially departing from the principles of the present invention. All such variations and modifications are intended to be included herein within the scope of the present invention, as set forth in the following claims.

That which is claimed:

1. A method, for facilitating a financial transaction between a buyer and a seller, comprising:
   receiving, by a financial transaction authentication server, from the buyer via a buyer wireless communications terminal, a money transfer request identifying a financial account of the buyer, a financial account of the seller, and an amount to be transferred from the financial account of the buyer to the financial account of the seller;

determining, by the financial transaction authentication server, in response to receiving the money transfer request from the buyer, a buyer location being a location of the buyer wireless communications terminal obtained from a global positioning system associated with the buyer wireless communications terminal;

determining, by the financial transaction authentication server, in response to receiving the money transfer request from the buyer, a seller location being a location of a seller wireless communications terminal obtained from a global positioning system associated with the seller wireless communications terminal;

calculating, by the financial transaction authentication server, for use subsequently in connection with the financial transaction between the buyer and the seller, a geographical proximity threshold value, wherein:

calculating the geographical proximity threshold value comprises generating the geographical proximity threshold value based on an ambient wireless interference condition;

calculating the geographical proximity threshold value comprises generating the geographical proximity threshold value based on a type of the buyer wireless communications terminal;

calculating the geographical proximity threshold value comprises generating the geographical proximity threshold value based on a type of the seller wireless communications terminal;

calculating the geographical proximity threshold value comprises generating the geographical proximity threshold value based on a particular time of day at which the money transfer request from the buyer is being received;

calculating the geographical proximity threshold value comprises generating the geographical proximity threshold value based on a history of use of the buyer and seller wireless communications terminals;

calculating the geographical proximity threshold value comprises generating the geographical proximity threshold value based on whether the buyer is a merchant; and calculating the geographical proximity threshold value comprises generating the geographical proximity threshold value based on whether the seller is a merchant;

determining, in a proximity-analysis operation, whether the buyer location is within the geographical proximity threshold value of the seller location; and authorizing, by the financial transaction authentication server, in response to a positive result of the proximity-analysis operation, the money transfer request.

2. The method of claim 1, wherein the wireless communications terminals are cell phones.

3. The method of claim 1, further comprising sending, by the financial transaction authentication server, in response to a negative result of the proximity-analysis operation, an alert to the buyer.

4. The method of claim 1, comprising suspending, in response to a negative result of the proximity-analysis operation, the money transfer request.

5. The method of claim 1, wherein:
the money transfer request further includes an indication of a first financial institution which manages the financial account of the buyer and an indication of a second financial institution which manages the financial account of the seller; and authorizing the money transfer request comprises sending, using the indication of the first financial institution and the indication of the second financial instruction indicated by the money transfer request, instructions to the first financial institution to transfer payment from the financial account of the buyer to the financial account of the seller at the second financial institution.

6. The method of claim 1, wherein:
the money transfer request further indicates a financial institution which manages both the financial account of the buyer and the financial account of the seller; and authorizing the money transfer request comprises sending instructions to the financial institution to transfer payment from the financial account of the buyer to the financial account of the seller.

7. A financial transaction authentication server comprising:
a processor; and
a computer-readable storage device being in communication with the processor and comprising computer-executable instructions that, when executed by the processor, cause the processor to perform operations, for facilitating a financial transaction between a buyer and a seller, comprising:

receiving, from the buyer via a buyer wireless communications terminal, a money transfer request identifying a financial account of the buyer, a financial account of the seller, and an amount to be transferred from the financial account of the buyer to the financial account of the seller;

determining, by the financial transaction authentication server, in response to receiving the money transfer request from the buyer, a buyer location being a location of the buyer wireless communications terminal obtained from a global positioning system associated with the buyer wireless communications terminal;

determining, by the financial transaction authentication server, in response to receiving the money transfer request from the buyer, a seller location being a location of a seller wireless communications terminal obtained from a global positioning system associated with the seller wireless communications terminal;

calculating, by the financial transaction authentication server, for use subsequently in connection with the financial transaction between the buyer and the seller, a geographical proximity threshold value, wherein:

calculating the geographical proximity threshold value comprises generating the geographical proximity threshold value based on an ambient wireless interference condition;

calculating the geographical proximity threshold value comprises generating the geographical proximity threshold value based on a type of the buyer wireless communications terminal;

calculating the geographical proximity threshold value comprises generating the geographical proximity threshold value based on a type of the seller wireless communications terminal;

calculating the geographical proximity threshold value comprises generating the geographical proximity threshold value based on a particular time of day at which the money transfer request from the buyer is being received;

calculating the geographical proximity threshold value comprises generating the geographical proximity threshold value based on a history of use of the buyer and seller wireless communications terminals;

calculating the geographical proximity threshold value comprises generating the geographical proximity threshold value based on whether the buyer is a merchant; and calculating the geographical proximity threshold value comprises generating the geographical proximity threshold value based on whether the seller is a merchant;

determining, in a proximity analysis, whether the buyer location is within the geographical proximity threshold value of the seller location; and authorizing, by the financial transaction authentication server, in response to a positive result of the proximity-analysis operation, the money transfer request.

8. The financial transaction authentication server of claim 7, wherein the wireless communications terminals are cell phones.

9. The financial transaction authentication server of claim 7, wherein the operations further comprise sending, by the financial transaction authentication server, in response to a negative result of the proximity analysis, an alert to the buyer.

10. The financial transaction authentication server of claim 7, wherein the operations further comprise suspending, in response to a negative result of the proximity analysis, the money transfer request if the locations of the buyer and seller wireless communications terminals are not within the predetermined geographical proximity of each other.

11. The financial transaction authentication server of claim 7, wherein:

the money transfer request further indicates a first financial institution that manages the financial account of the buyer and a second financial institution that manages the financial account of the seller; and the operation of authorizing the money transfer request comprises sending, based on the first financial institution and second financial instruction indicated by the money transfer request, instructions to the first financial institution to transfer payment from the financial account of the buyer to the financial account of the seller at the second financial institution.

12. The financial transaction authentication server of claim 7, wherein the money transfer request further indicates a financial institution that manages both the financial account of the buyer and the financial account of the seller.

13. The financial transaction authentication server of claim 12, wherein the operation of authorizing the money transfer request comprises sending instructions to the financial institution to transfer payment from the financial account of the buyer to the financial account of the seller.

14. A computer-readable storage device, for use at a financial transaction authentication server, and comprising computer-executable instructions that, when executed by a processor of the financial transaction authentication server, cause the processor of the financial transaction authentication server to perform operations, for facilitating a financial transaction between a buyer and a seller, comprising:

receiving, from the buyer via a buyer wireless communications terminal, a money transfer request identifying a financial account of the buyer, a financial account of the seller, and an amount to be transferred from the financial account of the buyer to the financial account of the seller;

determining, by the financial transaction authentication server, in response to receiving the money transfer request from the buyer, a buyer location being a location of the buyer wireless communications terminal obtained from a global positioning system associated with the buyer wireless communications terminal;

determining, by the financial transaction authentication server, in response to receiving the money transfer request from the buyer, a seller location being a location of a seller wireless communications terminal obtained from a global positioning system associated with the seller wireless communications terminal;

calculating, by the financial transaction authentication server, for use subsequently in connection with the financial transaction between the buyer and the seller, a geographical proximity threshold value, wherein:

calculating the geographical proximity threshold value comprises generating the geographical proximity threshold value based on an ambient wireless interference condition;

calculating the geographical proximity threshold value comprises generating the geographical proximity threshold value based on a type of the buyer wireless communications terminal;

calculating the geographical proximity threshold value comprises generating the geographical proximity threshold value based on a type of the seller wireless communications terminal;

calculating the geographical proximity threshold value comprises generating the geographical proximity threshold value based on a particular time of day at which the money transfer request from the buyer is being received;

calculating the geographical proximity threshold value comprises generating the geographical proximity threshold value based on a history of use of the buyer and seller wireless communications terminals;

calculating the geographical proximity threshold value comprises generating the geographical proximity threshold value based on whether the buyer is a merchant; and calculating the geographical proximity threshold value comprises generating the geographical proximity threshold value based on whether the seller is a merchant;

determining, in a proximity-analysis operation, whether the buyer location is within the geographical proximity threshold value of the seller location; and authorizing, by the financial transaction authentication server, in response to a positive result of the proximity-analysis operation, the money transfer request.

15. The computer-readable storage device of claim 14, wherein the wireless communications terminals are cell phones.

16. The computer-readable storage device of claim 14, wherein the operations further comprise sending, in response to a negative result of the proximity-analysis operation, an alert to the buyer.

17. The computer-readable storage device of claim 14, wherein the operations further comprise suspending, in response to a negative result of the proximity-analysis operation, the money transfer request if the locations of the buyer and seller wireless communications terminals are not within the predetermined geographical proximity of each other.

18. The computer-readable storage device of claim 14, wherein:
- the money transfer request further indicates a first financial institution that manages the financial account of the buyer and a second financial institution that manages the financial account of the seller; and
- the operation of authorizing the money transfer request comprises sending, based on the first financial institution and second financial instruction indicated by the money transfer request, instructions to the first financial institution to transfer payment from the financial account of the buyer to the financial account of the seller at the second financial institution.

19. The computer-readable storage device of claim 14, wherein the money transfer request further indicates a financial institution that manages both the financial account of the buyer and the financial account of the seller.

20. The computer-readable storage device of claim 19, wherein the operation of authorizing the money transfer request comprises sending instructions to the financial institution to transfer payment from the financial account of the buyer to the financial account of the seller.

* * * * *